United States Patent [19]
Sitton

[11] Patent Number: 5,165,197
[45] Date of Patent: * Nov. 24, 1992

[54] EASILY DETACHABLE PLASTIC HOOK FOR SPORT FISHING

[76] Inventor: Gary L. Sitton, 6025 Pinkstaff, Beaumont, Tex. 77006

[ * ] Notice: The portion of the term of this patent subsequent to May 30, 2006 has been disclaimed.

[21] Appl. No.: 653,037

[22] Filed: Feb. 8, 1991

Related U.S. Application Data

[63] Continuation-in-part of Ser. No. 521,176, Jun. 1, 1990, abandoned, which is a continuation of Ser. No. 611,742, May 18, 1984, Pat. No. 5,024,020, which is a continuation-in-part of Ser. No. 483,719, Apr. 11, 1983, Pat. No. 4,833,816.

[51] Int. Cl.$^5$ ............................................. A01K 83/00
[52] U.S. Cl. .................. 43/44.82; 43/44.83; 43/43.16
[58] Field of Search ............... 43/43.16, 44.82, 44.83

[56] References Cited

U.S. PATENT DOCUMENTS

| | | |
|---|---|---|
| 356,499 | 1/1887 | Pennell . |
| 842,594 | 1/1907 | Van Vleck et al. . |
| 1,313,372 | 8/1919 | Dodge . |
| 2,180,557 | 11/1939 | Skoverski . |
| 2,511,117 | 6/1950 | Loeb . |
| 2,531,981 | 11/1950 | Liebe . |
| 2,539,735 | 1/1951 | Forsyth . |
| 2,598,011 | 5/1952 | Pitre . |
| 2,624,146 | 1/1953 | Kahle . |
| 2,865,131 | 12/1958 | Ellis . |
| 2,995,858 | 8/1961 | Rathmann . |
| 3,399,482 | 9/1968 | Cox . |
| 3,562,948 | 2/1971 | Santo et al. . |
| 3,724,116 | 4/1973 | Lindner et al. . |
| 3,755,954 | 9/1973 | Lucius . |
| 3,834,060 | 9/1974 | Wagenknecht . |
| 4,060,928 | 12/1977 | Messler et al. . |
| 4,126,957 | 11/1978 | Randall . |
| 4,165,578 | 8/1979 | Klein . |
| 4,334,381 | 6/1982 | Carver . |
| 4,763,432 | 8/1988 | Barclay ................................ 43/7 |
| 4,833,816 | 5/1989 | Sitton et al. . |

FOREIGN PATENT DOCUMENTS

| | | |
|---|---|---|
| 273585 | 7/1927 | United Kingdom . |
| 973689 | 10/1964 | United Kingdom . |
| 1153567 | 5/1969 | United Kingdom . |
| 1204223 | 9/1970 | United Kingdom . |
| 1239000 | 7/1971 | United Kingdom . |
| 2067882A | 8/1981 | United Kingdom . |
| 2137861A | 10/1984 | United Kingdom . |
| 2158683A | 11/1985 | United Kingdom . |

*Primary Examiner*—Kurt C. Rowan
*Attorney, Agent, or Firm*—Vaden, Eickenroht, Thompson, Boulware & Feather

[57] ABSTRACT

A monolithic molded plastic fishing hook having a connection part adapted to connect to a monofilament fishing line. The hook by its unique parts is arranged to provide a shock absorber action during catching fish, to release from a hooked snag before the line breaks, and to maintain the axis of penetration of the barbed point substantially parallel to the line of action while under tension.

10 Claims, 2 Drawing Sheets

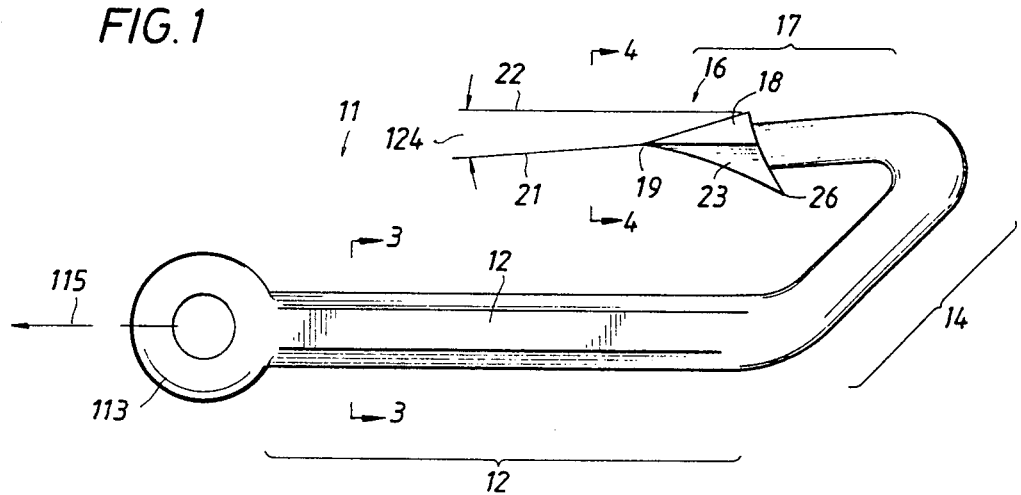
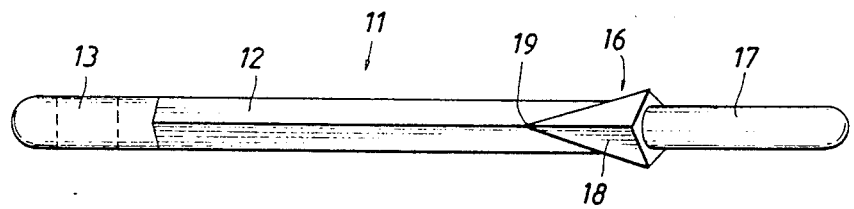
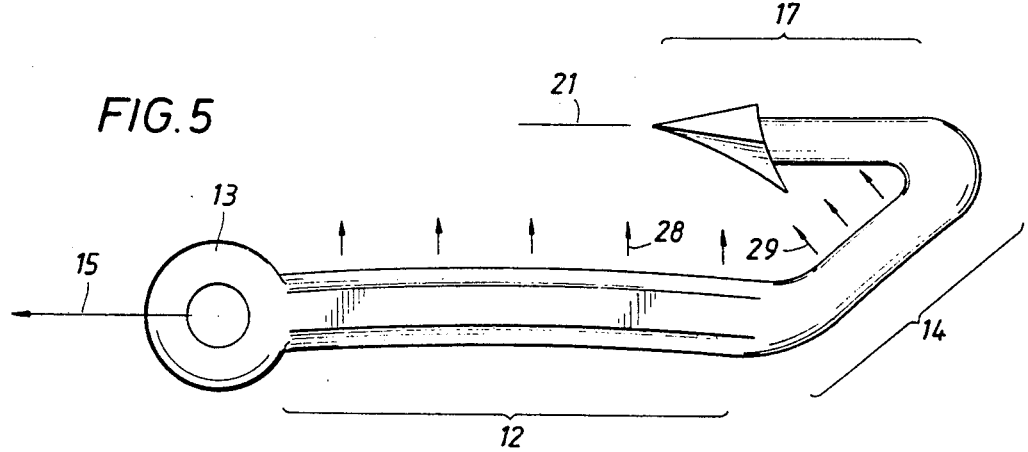

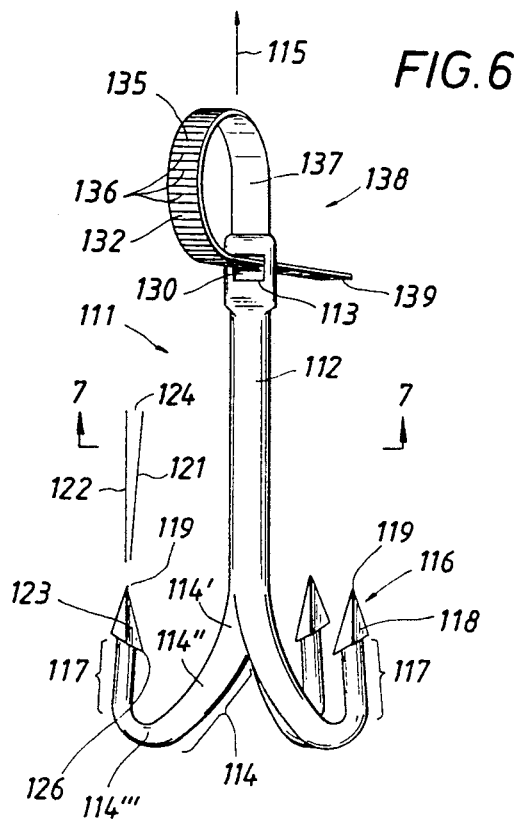
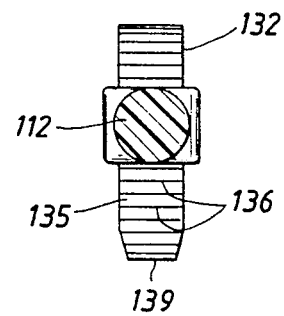
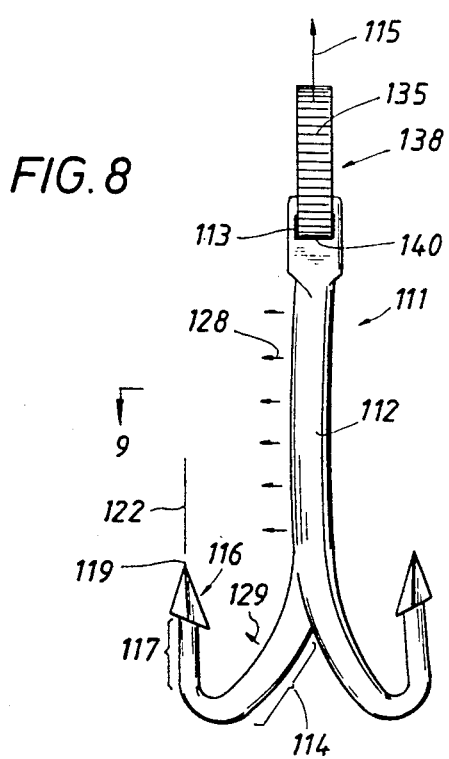
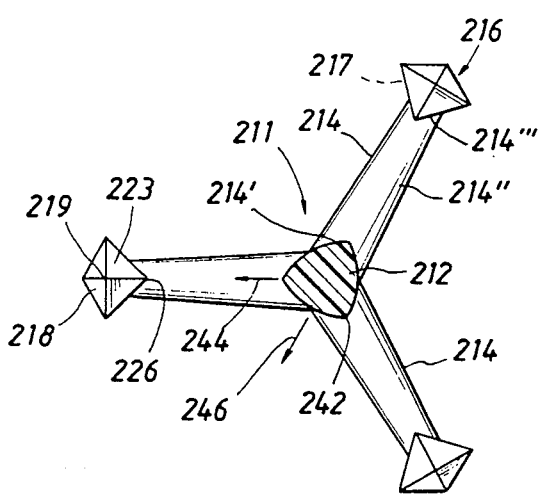
FIG.6
FIG.7
FIG.8
FIG.9

EASILY DETACHABLE PLASTIC HOOK FOR SPORT FISHING

This application is a continuation-in-part of co-pending patent application, Ser. No. 07/521,176, filed Jun. 1, 1990, and, entitled "Super Setter Plastic Fishing Hook" now abandoned, which is itself a continuation of co-pending application Ser. No. 06/611,742, filed May 18, 1984, and entitled "Super Setter Plastic Fishing Hook" now U.S. Pat. No. 5,024,020, which is in turn a continuation-in-part of co-pending application Ser. No. 483,719, filed Apr. 11, 1983, also entitled "Super Setter Plastic Fishing Hook", and now issued as U.S. Pat. No. 4,833,816.

BACKGROUND OF THE INVENTION

This invention relates to the field of fishing, and it more particularly relates to a unique fishing hook.

DESCRIPTION OF THE PRIOR ART

The art of fishing using a line and hook is ancient. Multitudes of hooks have been used and constructed from materials ranging from carved bones, metals, and even modern plastics. In most cases, the design of the hook was an overkill, i.e., the hook was the strongest part of the fishing system. Naturally, this design concept has caused many a fisherman to loose his tackle by hooking a snag. A strong pull by the fisherman, if it did not retrieve the snag, usually led to the line breaking somewhere along its length. This problem is particularly acute in the case of hooks with multiple barbs of the type which are used on most artificial fishing lures.

The design of the hook has been to prevent bending or uncurving of the bent part which connects the barbed point to the body secured to the fishing line. Although hooks have been proposed with flexible bends, they always prevented straightening and insured an inwardly curved motion to insure better hook setting results. Naturally, a self setting hook always holds the tightest to a snag, etc.

It has been found that a strong rigid hook, i.e., a heavy steel hook, does not always insure a hooked fish, even a fish that strikes very hard. The rigid hook causes a tensioning effect on the fishing line and unless its barbed point drives cleanly home in the cartilage of the fish's mouth, slight slippage of the point causes the hook to "spring" from the mouth and results in a lost fish. Thus, a hook that has a shock absorber action in firmly, but not rigidly pressing the barbed point on the fish's mouth, would be better that a cast iron-rigid hook. Also this spring action allows less tear in the fish's mouth which is particularly important when releasing a caught fish or if one "gets off the line".

Another limitation and/or disadvantage of known fishing hooks applies specifically to the so-called treble hook. In the treble hook configuration used on artificial lures, three barbs share a common body. Such hooks are attached to the lure by a split ring, an arrangement which is unsatisfactory for a number of reasons. For instance, there are many circumstances in which it is desirable to change the treble hook(s) on an artificial lure. To do so requires the spreading of the split ring while holding the lure and the moving of the treble hook into the gap in the spread split ring, all while not stabbing the sportsman with the multiple barbs of the treble hook. Human beings simply do not come equipped with enough hands to accomplish this operation quickly and safely. Further, many such lures are designed to have a certain action, or "look" (called "presentation"), to the unsuspecting fish. The use of the split ring to attach the hook(s) may at worst interfere with this action and at least provides an additional engineering/design consideration in developing the lure such that elimination of this structure would simplify development of the lure and increase the effectiveness of the lure as an artificial bait. Other problems are caused by the fact that, even though made of stainless steel, the split ring inevitably rusts over time. Further, the use of the split ring adds an assembly step to the manufacture of the lure, thereby increasing cost.

It is the purpose of this invention to provide a unique fishing hook that releases from a snag before breaking the fishing line but yet "hooks" a fish better that steel hooks.

Another purpose of the present invention is to provide a plastic treble hook which is conveniently attached directly to an artificial fishing lure without the need for a split ring.

Another purpose of the present invention is to provide a plastic treble hook which is uniquely adapted for use with an artificial fishing lure in that assembly of the lure is simplified and the means for attaching the hook to the lure does not interfere with the presentation of the lure.

Another purpose of the present invention is to provide a plastic treble hook which is both conveniently attached to an artificial lure and removed from the lure once it has been attached.

SUMMARY OF THE INVENTION

In accordance with this invention, there is provided a unique fishing hook formed of a monolithic molded member. The hook has an elongated body of uniform cross-sectional area and means formed in one end thereof for receiving a connection to the fishing line. Multiple looping reverse curved parts, each having a cross-sectional area not greater than the body, connect the body at its other end with a plurality of barbed points. The barbed points penetrate encountered animal forms in the direction of the connection part. If the hook becomes caught on an obstruction, the barbed point deflects outwardly from the body to straighten out the looping curved part so as to release the barbed point from the obstruction before the line pulling force reaches the rated fishing line strength. In a preferred embodiment, the connection receiving means comprises an eye in the body of the hook having a pawl integrally and flexibly united to the body so as to form one side of the eye and an elongated, flexible tongue formed integrally with the body and having a substantially uniform cross section and a plurality of detents formed in one side thereof. The cross sectional shape of the eye is formed so as to engage the side of the tongue opposite the side having the detents formed therein to ensure effective interengagement of the detents by the pawl in a manner effective to resist return movement of the tongue after the free end of the tongue has been drawn through the eye.

In one embodiment of the invention, the hook is constructed so that in a relaxed state each of the barbed points are inclined at a small angle toward the line of action of the body but when placed under tension, the barbed points are deflected outwardly to near parallel the line of action of the body, for optimally penetrating animal forms. This outward deflection occurs when the line pulling force approaches about 85% of the force required to release the barbed point from an obstruction. In an alternate embodiment, the barbed points will reach the parallel position when the line pulling force reaches a predetermined level within the range of 25 to 75% of the rated fishing line strength for which the hook is designated. This force level is less than the force required to free the barbed point from an obstruction. In either embodiment, the small angle of the barbed points is preferably about 4 degrees and the barbed points are of the nail point type.

In yet another embodiment, each of the barbed points, in a relaxed state, is parallel with the line of action of the body and is deflected outwardly when a snag is encountered and the line pulling force reaches a predetermined level less than the rated strength of the fishing line connected to the hook.

DESCRIPTION OF THE DRAWINGS

FIG. 1 is an elevation showing a fishing hook having a single barb constructed in accordance with the present invention;

FIG. 2 is a plan of the fishing hook of FIG. 1;

FIGS. 3 and 4 are cross-section and an end view along lines 3—3 and 4—4, respectively, of the fishing hook shown in FIG. 1;

FIG. 5 illustrates the beam loading effects upon the fishing hook of FIG. 1 for maximum penetration by its barbed point;

FIG. 6 is a perspective showing the preferred embodiment of the present fishing hook;

FIG. 7 is a cross-section along the lines 7—7 of the fishing hook shown in FIG. 6.

FIG. 8 illustrates the beam loading effects upon the fishing hook of FIG. 6 for maximum penetration by one of its barbed points.

FIG. 9 is a cross-sectional view similar to that of FIG. 7 of an alternative embodiment of the fishing hook of FIG. 6.

In these drawings, the several embodiments have common elements in the present fishing hook. In regard to these figures, like elements will carry like reference numerals to simplify description of the present invention in fishing hooks.

DESCRIPTION OF PREFERRED EMBODIMENTS

Referring to FIGS. 1 and 2, there is shown a fishing hook 11 constructed in accordance with the present invention. The hook 11 is a monolithic molded plastic member which can be formed in metal dies under high pressure and temperature molding from thermoplastics such as Xytel 330 or Rynite 35S, both trademarks of Dupont plastics. For example, the hook 11 can be molded at 550° F. and 8000 psi conditions in steel cavity molds. The hook 11, although monolithic, has a unique shape and cross-sectional relationship between its several parts to produce the novel results priorly listed and more fully discussed hereinafter.

The hook 11 has a body 12 of uniform cross-sectional area. Although the cross-section of the body 12 may be of any structural shape capable of producing the desired results, it is preferred that the cross-sectional shape be ellipsoidal, as is shown by reference to FIG. 3. The body 12 with this uniform cross-sectional shape provides an elastic beam which can deflect between its ends to a uniform curvature upon being subjected to a load proportional to its bendinq movement in the same manner as will be explained with regard to the embodiments shown in FIGS. 6–9.

Referring now to FIGS. 6–8, there is shown a treble hook 111 having the same elastic and deflection capabilities as the single hook 11 shown in FIGS. 1–3, and like reference numerals are used herein to denote common parts and/or functions in the explanation of the function of the various parts thereof. Consequently, when reference is made to a barbed point 116, that reference should also be construed as a reference to the barbed point 16 shown in FIG. 4. Like the hook 11, treble hook 111 is monolithic and may be molded of the same plastics as the hook 11. The hook 111 has a body 112 of uniform cross-sectional area, and it is preferred that the cross-sectional shape be round as shown by reference to FIG. 7. The body 112 with this uniform cross-sectional shape provides an elastic beam which can deflect between its ends to a uniform curvature upon being subjected to a load proportional to its bending movement.

Means, in the form of a "cat-tail" loop indicated generally at reference number 138, is adapted to connect the hook 111 with an artificial fishing lure (not shown). When one of the barbed points 116 of hook 111 encounters an object (hopefully a fish, but all too often, a snag), tension is transmitted from the fishing line (not shown) through the body of the lure to which hook 111 is attached to the object. The pulling force of the fishing line acts along a line-of-action 115 passing longitudinally through the body 112. Naturally, this force acting on the hook 111 produces both the bendinq movement and tension across the body 112.

The body 112, at its other end remote from the eye 113 connects with a plurality of looping curved parts 114, each of which forms a reverse curved shape and connects to a barbed point 116. The part 114 has a uniform cross-sectional shape like the body 112 in the area 114' immediately adjacent body 112 gradually changing in a transitional area 114" to the ellipsoidal cross-sectional shape (described below) of shank 117 in the area 114"' immediately adjacent shank 117, but in all three areas 114', 114", and 114"', its cross-sectional area is not as great as that of the body. There is a preferred relationship between these cross-sectional areas of the body 112, part 114, and shank 117 that will be described hereinafter. If a great enough force is applied to the hook, such as when an obstruction is snagged, the curved part 114 will straighten out sufficiently to release the barbed point 116 from the object.

The barbed point 116 has a shank 117 connected with the curved part 114 and an end formed into a head 118 ending at a sharp point 119. The shank 117 preferably has an ellipsoidal cross-sectional shape but is smaller in area than the adjacent end of the curved part 114. Each of the barbed points 116 has a penetration axis 121 residing in a plane common to the body and respective curved part 114 and extending lengthwise from the respective sharp point 119, through the respective shank 117 into the end of the curved point 114. In a relaxed state, the penetration axis 121 of each barbed point 116 may be parallel to its respective line-of-action 115 as shown by line 122 or may be inclined towards or away from the line-of-action by no more than a small angle. In the embodiment illustrated in FIGS. 6–8, the penetration axis of one of the points 116 is shown inclined toward the respective line-of-action 115 by a small angle 123. In this embodiment, good results are Obtained when this small angle 124 is less than 7.5 degrees, and best results occur with the small angle 123 being about 4 degrees.

It will be apparent that the hook 111 molded as a thermoplastic member has certain flexural properties. As the pull of the fishing line increases along the line-of-action 115, the barbed point 116 will exert a counter force on a hooked object such as a fish. The barbed point 116 is deflected outwardly, decreasing the small angle 124 towards zero. The cross-sectional areas of the body 112, curved part 114 and barbed point 116 are adjusted in relative beam strength so that the small angle 124 becomes zero when the fishing line pulling force approaches about 80-85 percent of the total pulling force along the line-of-action 115 required to straighten out the curved part 114 and release the barbed point 116 from the engaged object. This relationship of cross-sectional areas, for this unique result, can be defined by complex mathematical relationships but they can be easily determined by cut-and-try testing of the hook 111 and then adjusting the cross-sectional area relationships.

As the barbed point 116 becomes parallel to the line-of-action 115, e.g., co-incident with line 124 its penetration ability on fish members (flesh and cartilage) reaches an optimum. Thus, the heavier fish on a given hook construction will get the best penetration by the barbed point 116.

The heads 118 should be designed to not only give good penetration performance, but also to lock into the fish when penetration is effected. Good results are obtained when the head is formed as a nail point type with several planar or concave surfaces 123 merging at the point 119. Preferably, the inward ends of the surfaces 123 extend beyond and below (as at 126) with shank 117. Thus, once the head 118 passes through the flesh, the outwardly extending surfaces prevent withdrawal of the barbed point 116.

If desired, the head 118 can be of other design types, such as a pyramidal shape (not shown). In this construction, the head 118 has trapezoidally arranged flat surfaces merging to a point and with the inward surfaces extending below the shank 117 to perform the flesh lock function.

Preferably, the hook 111 is constructed so that for a given fishing line strength, each curved part 114 will deflect or straighten out to release the hook from an obstruction at a magnitude of fishing line pull of 90-95 percent of the test breaking strength of the line. For example, a 15 pound nylon monofilament fishing line is to be used with the hook 111. In this case, if one of the barbed points 116 encounters an obstacle, the respective curved part 114 will deflect to release the barbed point 116 at about 13.5 pounds pull on the hook 111. For this hook 111, the barbed point 116 is deflected into parallel with the respective line-of-action 115 when the line pulling force is about 11 pounds. With this arrangement of the hook 111, it will catch fish efficiently of the magnitude on 15 pound test line in a sportsmanlike manner. If a limb or other snag is snared or hooked, the hook 111 can be pulled free, and there is no loss or equipment through broken tackle, line or hook which quickly reassumes its relaxed state shape as shown in FIG. 4.

The functioning of the hooks 11 and 111 can be understood by viewing FIGS. 5 and 8 (the following discussion will refer to hook 111, but with the like numerals, is equally applicable to hook 11). The hook 111 is shown with one of the barbed points 116 secured with the point 119 against a restraint surface (not shown).

The line pull along the line-of-action 115 is of a magnitude to reduce the small angle 124 to zero and the penetration line 121 falls on, e.g., is co-incident with, the line 122.

At this condition the body 112 as an elastic beam, assumes a uniform radius of curvature through lateral deflection in the direction indicated by the arrows 128, e.g., toward the individual head 118 which has encountered the fish. Likewise, the curved part 114 is bent into a slightly greater curvature through lateral deflection indicated by the arrow 129. It will be apparent that this deflection of the body 112 and curved part 114 is induced flexure by design relationship of the respective cross-sectional areas (i.e., their bending movements).

If the line force were varied, as by a fighting fish, the hook 111 responds by variations in beam flexure, which is a shock absorber function. As a result of this function, the barbed point 116 is held with its point 119 against the encountered surface and does not tend to slip loose as does a hard, less resilient steel hook.

It will be apparent that a superior performing hook 111 is described, but also a hook that can be designed to pull free of a snag, etc., at some line pull less than the tensile strength of the fishing line. Then the hook 11 or 111 snaps-back to its relaxed state shape ready for a new fishing encounter.

As noted above, at its end opposite the multiple looping curved parts 114, body 112 is provided with means, indicated generally at 138, for receiving a connection to a fishing line, and it is specifically contemplated that the connection be provided by an artificial fishing line (not shown) such that connection receiving means 138 serves to secure hook 111 to an eyebolt or other structure (not shown) either secured to or integrally formed in the artificial lure. Connection receiving means 138 is comprised of an eye 113 formed in body 112 having a pawl 130 integrally and flexibly united to the body 112 so as to form one side of the eye 113 and an elongated, flexible tongue 132 formed integrally with the body 112. Tongue 132 is of substantially uniform cross-sectional shape and dimension and is preferably rectangular in cross-sectional shape, the first flat side 135 of the rectangularly shaped tongue 132 being provided with a plurality of detents, or serrations, 136 along the length thereof. Eye 113 is formed with a cross-sectional shape and dimension so as to allow tongue 132 to pass therethrough while engaging the second flat side 137 opposite the side 135 of tongue 132 having the detents 136 formed therein to ensure effective interengagement of the detents 136 by the pawl 130 in a manner effective to resist return movement of tongue 132 after the free end 139 of tongue 132 has been drawn through eye 113. Pawl 130 is preferably provided with a tab 140 (see FIG. 8) extending out of eye 113 a short distance which, when depressed, disengages pawl 130 from tongue 132 to allow tongue 132 to be withdrawn from eye 113. Connection receiving means 138 is designated by this term because, if desired, the tongue 132 can simply be snipped off of hook 112 immediately above eye 113 so that the hook 112 can be secured directly to a fishing line by passing the line through eye 113.

Now referring to FIG. 9, there is shown (in cross section as if the view were taken along the lines 9—9 in FIG. 8 so as to show the differences there between) a fishing hook 211, comprising a further embodiment of this invention, and constituting a monolithic molded plastic member which can be formed of the materials and under the conditions hereinabove described for the embodiment shown in FIGS. 6-8. The hook 211 includes body portion 212 of uniform cross-sectional shape which is triangular. An eye 213 (not visible in the view shown in FIG. 9) is formed at one end of the body 212 and a fishing lure (not shown) is attached to the hook 211 by tongue 232 (likewise not visible) as previously described. At its other end, the body 212 connects through a transitional area 214″ in the same manner as described above for the transitional area 114″ with a plurality of looping curved portions 214, each of which forms a reverse curved shape and connects to a barbed point 216. The parts 214 each have a uniform cross-sectional shape the area of which corresponds to, but is smaller than, that of body 212. Shank 217 (the view of which is blocked by the barbed point 216 in FIG. 9) connects the curved part 214 with the barbed point 216. The shank 217 preferably has a circular cross-sectional shape, smaller in cross-sectional area than the adjacent end of the curved part 214.

As in the previous embodiment, the head 218 is formed as a nail point type head with several planar or concave surfaces 223 merging at point 219. Preferably the inward ends of the surfaces 223 extend beyond and below (as at point 226) with shank 217. Thus, once the head 218 passes through the flesh, the outwardly extending surfaces prevent withdrawal of the barbed point 216. In a relaxed state, each barbed point 216 has a penetration axis 221 (again, not able to be shown in FIG. 9) extending lengthwise from its sharp point 219 through the respective shank 217 into the end of the respective curved part 214. The penetration axis 221 of each point 216 resides in a plane common to the body and, in the illustrated embodiment, is inclined at the small angle 224 to the respective line of action 215 passing longitudinally through the body 212. Good results are obtained when the small angle 224 is less than 7.5° and best results occur when the small angle 224 is about 4°. As in the previous embodiment of the invention, the penetration axis could, if desired, be positioned parallel to the line-of-action 215, or even inclined away therefrom at a single angle, with equally effective results.

Table A represents the International Game Fishing Association (IGFA) standards for adjusting the drag on a fishing line for a particular line strength.

TABLE A

| # | IGFA Line Class | Recommended Strike Setting | Full or Maximum Setting |
| --- | --- | --- | --- |
| 12H | 12 | 3-5 lbs. | 6-8 lbs. |
| 30 | 20 | 4-7 lbs. | 101-12 lbs. |
| 50 | 30 | 7-10 lbs. | 15-18 lbs. |
| 50W | 50 | 12-17 lbs. | 21-26 lbs. |
| 80 | 50 | 12-28 lbs. | 21-26 lbs. |
| 80W | 80-80 | 30-45 lbs. | 35-40 lbs. |
| 130 | 130 | 35-40 lbs. | 55-65 lbs. |

In the embodiment shown in FIGS. 6-8 and 9, for a given IGFA line class, the size of the hook and the relative cross-sectional areas of, for instance, body 212, curved part 214 and shank 217 may be adjusted so that the small angle 224 becomes zero when the fishing line pulling force approaches a predetermined value within the range between the recommended IGFA strike setting and the full maximum setting. In other words, the small angle 224 becomes zero between 25% and 75% of the rated (breaking) line strength for which the hook is designed. Preferably, the small angle becomes zero at the values listed under Strike Setting for a certain IGFA Line Class in Table A. Then, the 5 lbs. value for decreasing the angle 224 to zero is suitable for both 12 and 20 lbs. IGFA line classes.

The triangular shape of body 212 functions of follows. When one of the barbed points 216 encounters an object and the line pull along the line-of-action 215 is of a magnitude to reduce the small angle 224 to zero, the penetration line 221 falls on the line 222. As is the case with the body 12 and 112 shown in FIGS. 1 and 6, at this condition (e.g., when the penetration line 221 and line 222 are coincident) the body 212 acts as an elastic beam, assuming a uniform radius of curvature through lateral deflection in the direction indicated by arrows 228 (see arrows 128 in FIG. 8), e.g., toward the individual head 218 which encountered the object. Likewise, the curved part 214 connecting that respective head 218 to body 212 is bent into a slightly greater curvature through lateral deflection indicated by the arrows 229 (see arrow 129 in FIG. 8). It will be apparent that this deflection of the body 212 tends to be confined to the direction of the arrows 228 by the triangular shape of body 212 and by design relationship of the respective cross-sectional areas. Note also that in the event that two of the barbed points 219 encounter an object, the triangular shape of body 212 causes the deflection of the body 212 in a direction which is approximately half way between the direction the body 212 is deflected if either one of the two points were involved.

This directionally-induced flexure can be more fully explained by noting that, as shown in FIG. 9, the apexes 242 of the triangularly-shaped body 212 are oriented so as to point toward each of the respective points 219, thereby stiffening body 212 against deflection in the direction of arrow 244 (e.g., in the same direction as arrows 128 in FIG. 8). If two of the points 219 are engaged by the same object, the deflection is in the direction of arrow 246, approximately half way between the two points 219 that engaged the object. But instead of having twice as much resistance to the deflection of body 212 in the direction of arrow 246, as might be expected from the involvement of two of the respective curved parts 214, the deflection occurs when about the same pull is exerted along the line of action 215 because of the absence of an apex 242 along the side of the triangular body to resist deflection in the direction of arrow 246. A similar result can be achieved using a Y-shaped body (not shown), with each of the three "legs" of the Y being oriented so as to point toward one of the three points 219.

Each of the alternative embodiments described herein also exhibits shock absorbing functions as previously described for the embodiment shown in FIGS. 1-5, wherein the flexure of the body 12, curved part 14 and shank 17 assist the barbed point 16 in resiliently penetrating a fish. Importantly, in these embodiments, the present hook becomes an integrated part of the fishing system for novel results as compared to the strongest part (overkill) design of the conventional fishing hook made of metal.

In the above discussions, it has been assumed that the barbed point of the fishing hook has encountered the obstruction. However, it is possible for a small diameter submerged tree limb, etc., to slip past the barbed point and contact the fishing hook in the curved portion connecting the body with the shank. The size of the hook and the relative cross-sectional area of the body curved part and shank are adjusted so that the curved portion will straighten out and release the hook when the line pulling force reaches a predetermined level with the IGFA Full or Maximum Setting given in Table A. Preferably, the hook is also constructed so that at the same time the hook will be released from an obstruction on the barbed point when the line pulling force reaches a predetermined level within the IGFA recommended strike setting given in Table A, or approximately one-third (⅓) of the force required to straighten out the hook when pulling on the curved part.

From the foregoing, it will be apparent that there has been provided a novel hook for fishing. It will be appreciated that certain changes or alterations in the present hook may be made without departing from the spirit of this invention. These changes are contemplated by and are within the scope of the appended claims which define the invention. Additionally, the present description is intended to be taken as an illustration of this invention.

What is claimed is:

1. The fishing hook formed as a monolithic molded plastic member for supporting fishing bait, said hook comprising:
   (a) an elongated body of uniform cross-sectional area having a line of action extending longitudinally therethrough;
   (b) a connection part adapted to connect with a fishing line at one end of said body;
   (c) two or more looping curved parts forming a reverse curve connecting said body to barbed points at the end of said curved parts;
   (d) said barbed points adapted for penetration of an encountered animal form in the direction of said connection parts;
   (e) said barbed points having a penetration axis residing substantially in a plane common to said body and said curved part connecting said barbed point to said body;
   (f) each of said looping curved parts having a cross-sectional area not greater than said body;
   (g) said cross-sectional areas of said body and said looping curve parts adjusted in relative beam strength whereby the total line pulling force required to straighten out said looping curved part and release said barbed points from an engaged object such as animal form is approximately 95% of the tensile strength of the fishing line secured to said connection part and whereby said penetration axis of said barbed point is deflected outwardly past parallel with said line of action of said body when the line pulling force of said connection part approaches a predetermined level less than that required to straighten out said looping curved part and release said barbed point from an engaged object.

2. The fishing hook of claim 1, further comprising one or more spurs mounted on said connection part extending outwardly therefrom inclined obliquely with respect to the line of action of said body for securing the fishing bait to the hook.

3. The fishing hook of claim 1, wherein said barbed points are located equal distance from each other.

4. A monolithic plastic fishing hook for use with a sport fishing lure providing a connection to a fishing line comprising:
   an elongated plastic body of uniform cross-sectional area having a plurality of integral looping curved and barbed point parts formed at one end thereof, said body having a line of action extending longitudinally therethrough, each of said looping curved parts forming a reverse curve connecting said elongated body to one of said barbed points, the cross-sectional area of each of said looping curved parts being sized smaller than the cross-sectional area of said elongated body;
   integral means formed in the end of said body opposite said looping curved and barbed point parts for receiving a connection to a fishing line comprising:
   an eye formed in said body,
   a pawl integrally and flexibly united to said body so as to form one side of the eye, and
   an elongated, flexible tongue formed integrally with said body and having a substantially uniform cross-sectional shape and a plurality of detents formed therein, the cross-sectional shape of the eye being formed so as to engage the tongue to cause the detents formed in the tongue to be interengaged by the pawl in a manner effective to resist return movement of the tongue after the free end of the tongue has been drawn through the eye to receive a connection to a fishing line; and
   each of said barbed points being adapted for penetrating an encountered animal form and having a penetration axis residing substantially in a plane common to said body, the cross-sectional area of each of said looping curved parts being sized relative to the cross-sectional area of said body so as to adjust the beam strength of each of said looping curved parts to allow each of said looping curved parts to straighten to release a respective barbed point integral therewith from an engaged object when a force of approximately 95% of the tensile strength of the fishing line to which said body is connected is exerted along the line of action of said body, causing the penetration axis of the respective barbed point to deflect outwardly past parallel with the line of action of said body when a force exerted therealong approaches a predetermined level, said predetermined level being less than about 95% of the tensile strength of the fishing line to which said body is connected.

5. The fishing hooke of claim 4 wherein said predetermined level is approximately 85% of the force which when exerted along the line of action of said body, straightens out the respective looping curved part with which the barbed point which has engaged an object is integral.

6. The fishing hook of claim 4 wherein said predetermined level is approximately 85% of the force which, when exerted along the line of action of said body, straightens out two respective looping curved parts with which two barbed points which have engaged an object are integral.

7. The fishing hook of claim 4 wherein said predetermined level is between about 25% and about 95% of the tensile strength of the fishing line to which said body is connected.

8. The fishing hook of claim 4 wherein said body is triangularly shaped in cross-section.

9. The fishing hook of claim 8 wherein the apexes of the triangularly-shaped body are oriented toward each of three of said barbed points.

10. The fishing hook of claim 9 wherein said predetermined level is approximately 85% of the force which, when exerted along the line of action of said body, straightens out two of the three respective looping curved parts with which two barbed points which have engaged an object are integral.

* * * * *